United States Patent
Sakamoto et al.

(10) Patent No.: US 11,538,252 B2
(45) Date of Patent: Dec. 27, 2022

(54) OBJECT RECOGNITION DEVICE

(71) Applicant: TOYOTA JIDOSHA KABUSHIKI KAISHA, Toyota (JP)

(72) Inventors: Hiroshi Sakamoto, Susono (JP); Ryosuke Fukatani, Susono (JP); Hideyuki Matsui, Shizuoka-ken (JP); Junya Ueno, Susono (JP); Kazuki Tamura, Susono (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 364 days.

(21) Appl. No.: 16/993,664

(22) Filed: Aug. 14, 2020

(65) Prior Publication Data
US 2021/0056319 A1  Feb. 25, 2021

(30) Foreign Application Priority Data

Aug. 22, 2019 (JP) .............................. JP2019-152224

(51) Int. Cl.
| | |
|---|---|
| G06V 20/00 | (2022.01) |
| G06V 20/56 | (2022.01) |
| G06T 7/70 | (2017.01) |
| G01S 17/86 | (2020.01) |
| G01S 7/48 | (2006.01) |
| G01S 17/42 | (2006.01) |

(52) U.S. Cl.
CPC .............. *G06V 20/56* (2022.01); *G01S 17/86* (2020.01); *G06T 7/70* (2017.01); *G01S 7/4802* (2013.01); *G01S 17/42* (2013.01); *G06T 2207/10024* (2013.01); *G06T 2207/10028* (2013.01); *G06T 2207/30252* (2013.01)

(58) Field of Classification Search
CPC combination set(s) only.
See application file for complete search history.

(56) References Cited

U.S. PATENT DOCUMENTS

2018/0316873 A1* 11/2018 Wei .................. G08G 1/167

FOREIGN PATENT DOCUMENTS

| JP | 2012-145444 A | 8/2012 |
|---|---|---|
| JP | 2018-048949 A | 3/2018 |

OTHER PUBLICATIONS

Kusenbach et al., A new geometric 3D LiDAR feature for model creation and classification of moving objects, 2016 IEEE Intelligent Vehicles Symposium (IV), Jun. 19-22 (Year: 2016).*

(Continued)

*Primary Examiner* — Nancy Bitar
*Assistant Examiner* — Xiao Liu
(74) *Attorney, Agent, or Firm* — Sughrue Mion, PLLC

(57) ABSTRACT

In step S11, a color image CIMG is acquired. In step S12, a distance image DIMG is acquired. In step S13, the color image CIMG is projected onto the distance image DIMG. An alignment of the color image CIMG and the distance image DIMG is performed prior to the projection of the color image CIMG. In step S14, it is determined whether or not a basic condition is satisfied. In S15, it is determined whether or not a special condition is satisfied. If a judgement result of the steps S14 or S15 is positive, then in step S16 a first data point and a second data point on the distance image DIMG are associated. If bot of the judgement results of steps S14 and S15 are negative, data points are not associated in step S17.

4 Claims, 12 Drawing Sheets

(56) References Cited

OTHER PUBLICATIONS

Zhao et al, Lidar-camera Based 3D Obstacle Detection for UGVs, 2019 IEEE 15th International Conference on Control and Automation (ICCA), Jul. 16-19 (Year: 2019).*

Anh Vu Le et al., "Directional Joint Bilateral Filter for Depth Images", Sensors 2014, 14, May 4, 2014, pp. 11362-11378.

* cited by examiner

OBJECT RECOGNITION DEVICE

CROSS-REFERENCE TO RELATED APPLICATION

The present application claims priority under 35 U.S.C. § 119 to Japanese Patent Application No. 2019-152224, filed Aug. 22, 2019. The contents of this application are incorporated herein by reference in their entirety.

FIELD

Present disclosure relates to an object recognition device installed in a vehicle.

BACKGROUND

JP2012-145444A discloses an object recognition device in which clustering processing is executed by using a data point group detected by a LIDAR (Laser Imaging Detection And Ranging). The data point group consists of 3D positional data (i.e., X, Y, and Z positional data) in a number of detected points. In the clustering processing, processing including comparison of the 3D data among the detected points, thereby detected points that can be recognized as a single object are grouped together.

SUMMARY

The LIDER uses time of flight (TOF) of laser beam to generate the Z positional data (i.e., TOF data). Therefore, when the time of flight is not measured, the Z positional data is not obtained. If the Z positional data is not obtained, a blank region occurs in data point group. In this instance, the blank region is not subject to the clustering processing.

Two reasons are assumed when the time of flight was not measured. One is that there was no object to reflect irradiated light of the laser beam. The other is that there was a low reflecting object that absorbs the irradiated light (e.g., a black type object). Therefore, in the latter case, the clustering processing is not executed correctly, and there is a possibility that the recognition of the low reflecting object is erroneously performed.

One object of present disclosure is to provide an object recognition device capable of recognizing the low reflecting object that absorbs the laser beam irradiated from the LIDAR.

A first aspect is an object recognition device that solves the above problem and has the following features.

The object recognition device comprises a LIDAR and a processing unit.

The LIDAR is configured to irradiate laser beam around a vehicle and detect laser beam reflected at surroundings of the vehicle.

The processing unit is configured to execute clustering processing of detected point group of the LIDAR based on 3D positional data of respective detected point including time of flight data of the laser beam.

The object recognition device further comprises a color image acquiring portion.

The color image acquiring portion is configured to acquire color images of the surroundings.

In the clustering processing, the processing unit is configured to associate a first detection point corresponding to a first coordinate with a second detection point corresponding to a second coordinate when a linkable condition is satisfied in the first and second coordinates on a distance image represented by the 3D positional data.

The linkable condition is satisfied when a distance between the first and second coordinates is greater than or equal to a predetermined distance, a difference in the time of flight data between the first and second detection points is less than a predetermined difference, and a condition for coordinate is satisfied.

The condition for coordinate is satisfied when a route coordinate indicating a coordinate locating on a route between the first and second coordinates is an undetected coordinate at which the time of flight data has not been calculated, and a color pixel value indicating a pixel value of every coordinate that overlaps the route coordinate is a preset black type pixel value.

A second aspect further has the following features in the first aspect.

The processing unit is further configured to execute interpolation processing before the execution of the clustering processing.

The interpolation processing is processing to interpolate the time of flight data in the undetected coordinate.

In the interpolate processing, the processing unit takes up data for interpolation as the time of flight data at the undetected coordinate if applicable condition is satisfied.

The applicable condition is satisfied when the color pixel value of the undetected coordinate after the interpolation is the preset black type pixel value.

A third aspect further has the following features in the second aspect.

The data for interpolation is the time of flight data at a coordinate having shortest distance from the undetected coordinate in a negative direction in a vertical axis of the distance image.

A fourth aspect further has the following features in the second aspect.

The object recognition device further comprises a positional information acquisition portion and a database.

The positional information acquisition portion is configured to acquire a positional information of the vehicle.

The database is configured to store terrain information.

In the interpolation processing, the processing unit is further configured to specify a road surface coordinate indicating a coordinate corresponding to a road surface from coordinates of the distance image based on the positional information and the terrain information.

The data for interpolation is the time of flight data at the road surface coordinate having shortest distance from the undetected coordinate in a negative direction in a vertical axis of the distance image.

According to the first aspect, the first detection point and the second detection point are associated when the linkable condition is satisfied. According to the linkable condition, it is possible to associate the first and second detection points even if there is the undetected coordinate between the first and second coordinates. This makes it easier for these detected points to be grouped into the same cluster in the clustering processing. Therefore, it is possible to suppress a misidentification of the low reflecting object.

According to the second aspect, the interpolation processing is executed prior to the execution of the clustering processing. In the interpolation processing, if the applicable condition is satisfied, the data for interpolation is taken up as the time of flight data in the undetected coordinate. Therefore, it is possible to reduce a computational load on the clustering processing.

According to the third aspect, the time of flight data at the coordinate having the shortest distance from the undetected coordinate in the negative direction in the vertical axis of the distance image is taken up as the data for interpolation. Therefore, it is possible to improve an accuracy of the clustering processing.

According to the fourth aspect, the time of flight data at the road surface coordinate having shortest distance from the undetected coordinate in a negative direction in a vertical axis of the distance image is taken up as the data for interpolation. Therefore, it is possible to improve an accuracy of the clustering processing.

DESCRIPTION OF EMBODIMENTS

Embodiments of the present disclosure are described hereunder with reference to the accompanying drawings. However, it is to be understood that even when the number, quantity, amount, range or other numerical attribute of an element is mentioned in the following description of the embodiments, the present disclosure is not limited to the mentioned numerical attribute unless it is expressly stated or theoretically defined. Further, structures or steps or the like described in conjunction with the following embodiments are not necessarily essential to embodiments of the present disclosure unless expressly stated or theoretically defined.

1. First Embodiment

Figure 1:
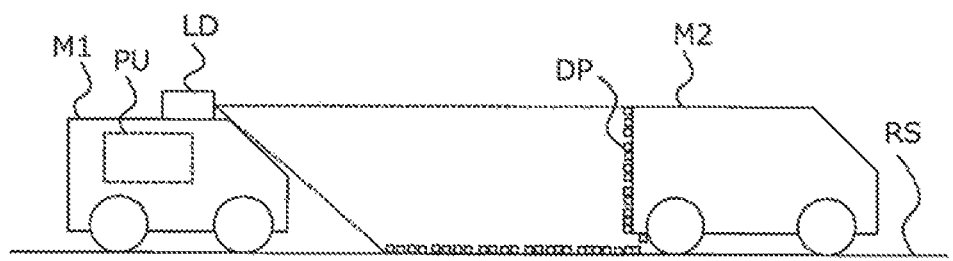
FIG. 1 is a diagram for explaining an assumption of the present application.

First, a first embodiment of the present disclosure will be described with reference to FIGS. 1 to 7.
1.1 Assumption FIG. 1 is a diagram for illustrating an assumption of the present disclosure. A vehicle M1 is drawn on FIG. 1. A LIDAR LD is mounted on the vehicle M1. The LIDAR LD irradiates laser beam around the vehicle M1 and detects laser beam reflected at surrounding thereof. When laser beam is detected by the LIDAR LD, a data point group is obtained. The data point group consists of 3D positional data (i.e., X, Y, and Z positional data) in a number of detected points. To the data point group, acquisition time of the 3D positional data and position data of the LIDAR LD with respect to this acquisition time (i.e., latitude and longitude data) may be added.

The vehicle M1 comprises a processing unit PU. The processing unit PU executes object recognition processing. The object recognition processing includes clustering processing. The clustering processing is processing to group the data point group into plurality of clusters based on the 3D positional data. In the clustering processing, the present disclosure is characterized in that processing to associate at least two pieces of data point is executed. There is no particular limitation on the object recognition processing based on the clusters obtained through the execution of the clustering processing, and a known technique is applied thereto.

In FIG. 1, a road surface RS on which the vehicle M1 runs is depicted. When the laser beam reflected by the road surface RS is detected by the LIDAR LD, the 3D positional data in a number of the detected points on the road surface RS is obtained. In FIG. 1, a vehicle M2 is depicted in front of vehicle M1. The vehicle M2 may be moving or stationary. The vehicle M2 may be a moving body that differs from a vehicle or may be a stationary body. When the laser beam reflected by the vehicle M2 is detected by the LIDAR LD, the 3D positional data in a number of the detected points on the vehicle M2 is obtained. Each of data point DP shown in FIG. 1 is a schematic representation of the detected points of the road surface RS and the vehicle M2.

1.2 Problems in Clustering Processing

As described above, when the time of flight was not measured by the LIDAR LD, two reasons are assumed: one is that there was no object to reflect irradiated light of the laser beam; the other is that there was a low reflecting object that absorbs the irradiated light. Problems in the latter cases will be explained with reference to FIGS. 2 and 3.

In these figures, two types of images are schematically shown. The two types of the images are a color image CIMG and a distance image DIMG of a rear portion $RE_{M2}$ of the vehicle M2. The color image CIMG is an RGB-image acquired from a camera or an image sensor. In the RGB image, a pixel value of 2D position coordinate is represented by a RGB value. That is, a pixel value IC(x, y) of a coordinate CC(x, y) in the color image CIMG is expressed by the RGB-value. Note that the pixel value IC(x, y) corresponds to a "color pixel value" in the present disclosure. The color image CIMG may be represented by using a CMY value, a CMYK value, an HSV value, or an HLS value.

The distance image DIMG is an image represented by the 3D positional data. Each coordinate of the distance image DIMG is represented by the pixel value according to Z positional data (i.e., TOF data) in the data point DP. Specifically, a pixel value ID(x, y) of a coordinate CD(x, y) in the distance image DIMG is represented by the pixel value according to the TOF. For example, the pixel value ID(x, y) is represented by a smaller pixel value as the TOF becomes shorter while being represented by a larger pixel value as the TOF becomes longer.

Figure 2:
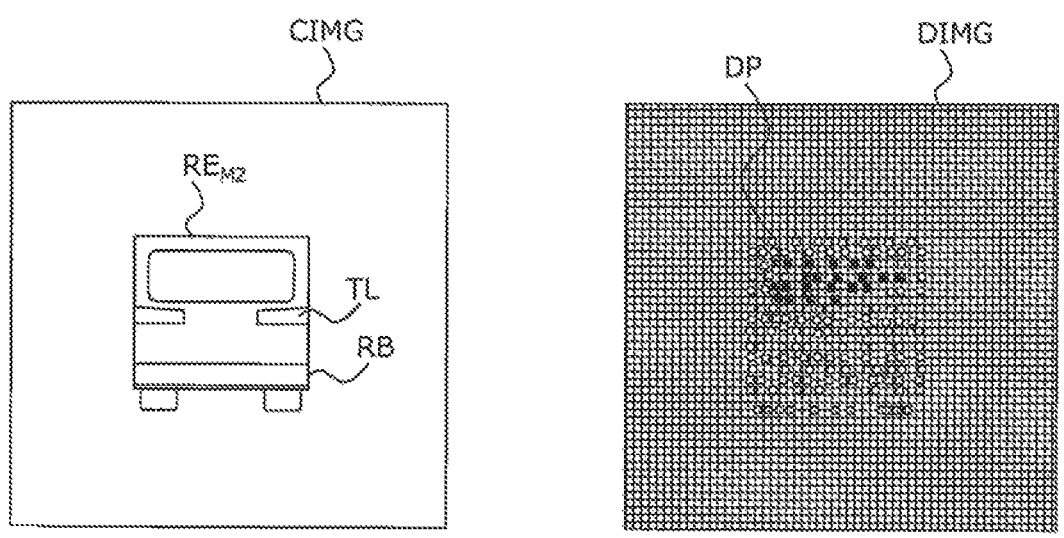
FIG. 2 is a schematic diagram for showing an image of a rear portion of a preceding vehicle whose body color is white type.

FIG. 2 shows the image of the rear portion $RE_{M2}$ when a body color of the vehicle M2 is white type. As shown in the distance image DIMG, when the body color is white type, the laser beam is easily reflected on a surface of the rear portion $RE_{M2}$. Therefore, a number of the data point DPs corresponding to the detected points of the rear portion $RE_{M2}$ can be obtained. Therefore, in this situation, the data point DPs are easily grouped into same cluster in the clustering processing.

Figure 3:
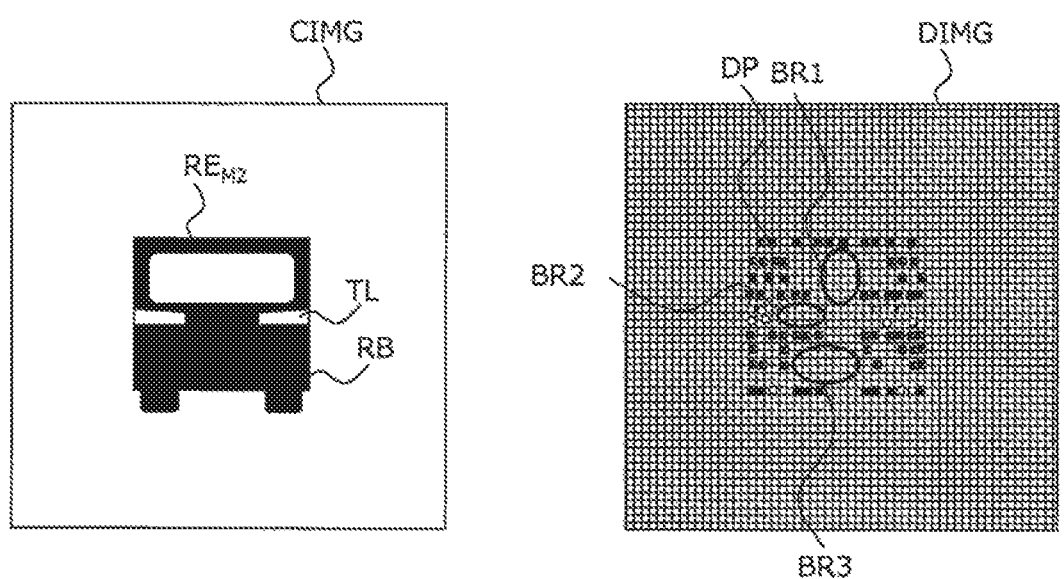
FIG. 3 is a schematic diagram for showing an image of the rear portion of the preceding vehicle whose body color is black type.

FIG. 3 shows an image of the rear portion $RE_{M2}$ when the body color of the vehicle M2 is black type. As shown in the distance image DIMG, when the body color is black type, the data point DPs can be obtained only in a part of an area of the rear portion $RE_{M2}$ such as a tail light TL and a rear bumper RB. This is because the laser beam is not reflected by the rear portion $RE_{M2}$ and the TOF was not measured.

In FIG. 3, three regions (hereinafter referred to as "undetected regions") BR1 to 3 in which no Z positional data was obtained are depicted. The coordinate CD(x, y) consisting of the undetected regions BR is referred to an "undetected coordinate $CD_{BR}(x, y)$". Then, each of pixel values $ID_{BR}(x, y)$ of the undetected coordinates $CD_{BR}(x, y)$ is represented by the RGB-value of black type. The inclusion of such the undetected coordinates $CD_{BR}(x, y)$ in the distance image DIMG means that there is a blank region in the data point group. If the blank region is in the data point group, it separates the data point DPs corresponding to the detected points of the rear portion $RE_{M2}$. This makes it difficult to group the data point DPs into the same cluster.

1.3 Features of Object Recognition Processing in First Embodiment

Thus, if there is the low reflecting object absorbing the laser beam, the clustering processing may not be executed correctly, and this object may be incorrectly recognized Therefore, in the clustering processing according to the first embodiment, basic and special conditions are set as conditions for associating arbitrary two data point DPs in the distance image DIMG (linkable condition). For convenience of explanation, the arbitrary two data point DPs are referred to as a "first data point $DP_1$" and a "second data point $DP_2$" in the following description.

1.3.1 Basic Condition

The basic condition is a condition that is regularly used to associate the first data point $DP_1$ with the second data point $DP_2$. The basic condition consists of the following terms (i) and (ii) for a first coordinate $CD_{DP1}(x, y)$ and a second coordinate $CD_{DP2}(x, y)$. Note that the first coordinate $CD_{DP1}(x, y)$ is a coordinate CD(x, y) corresponding to the first data point $DP_1$. The second coordinate $CD_{DP2}(x, y)$ is the coordinate CD(x, y) corresponding to the second data point $DP_2$.

(i) A distance dC between the first coordinate $CD_{DP1}(x, y)$ and the second coordinate $CD_{DP2}(x, y)$ is less than a predetermined distance $dC_{TH}$ (ii) A difference dT between the TOF data $TD_{DP1}(x, y)$ and the TOF data $TD_{DP2}(x, y)$ is less than a predetermined difference $dT_{TH}$ The predetermined distance $dC_{TH}$ is a threshold preset on the basis of a typical vehicle width (i.e., about 2 meter). The predetermined difference $dT_{TH}$ is the threshold where two TOFs are recognized as comparable time. Note that the TOF data $TD_{DP1}(x, y)$ is the Z positional data in the first data point $DP_1$. The TOF data $TD_{DP2}(x, y)$ is the Z positional data in the second data point $DP_2$. If the terms (i) and (ii) are satisfied simultaneously, then the basic condition is satisfied.

1.3.2 Special Condition

The special condition is a condition used to associate the second data point $DP_2$ with the first data point $DP_1$ that could not be associated under the basic condition. The special condition consists of the following terms (iii) to (v) for the first coordinate $CD_{DP1}(x, y)$ and the second coordinate $CD_{DP2}(x, y)$.

(iii) The distance dC is equal to or more than the predetermined distance $dC_{TH}$ (iv) The difference dT is less than the predetermined difference $dT_{TH}$ (v) Satisfy a condition for coordinate If the terms (iii), (iv) and (v) are satisfied simultaneously, then the special condition is satisfied. Note that the condition (iv) is the same as the condition (ii).

The condition for coordinate shown in the term (v) consists of the following terms ($v_1$) and ($v_2$).

($v_1$) A route coordinate $CD_L(x, y)$ corresponds to the undetected coordinate $CD_{BR}(x, y)$ ($v_2$) When an alignment of the distance image DIMG and the color image CIMG is performed, all pixel value $ICs(x, y)$ of the coordinate CC(x, y) that overlaps the coordinate $CD_L(x, y)$ correspond to the preset black type pixel value The route coordinate $CD_L(x, y)$ is the coordinate CD(x, y) located on a path between the first coordinate $CD_{DP1}(x, y)$ and the second coordinate $CD_{DP2}(x, y)$. The number of the route coordinate $CD_L(x, y)$ is at least one. The "preset black type pixel value" includes the RBG-value of black type. The "RBG-value of black type" refers to the RGB-value in which each value of the RBG-value is less than a predetermined value (for example, each value is about 50 when the RGB-value is represented in 256 gradations). If the terms ($v_1$) and ($v_2$) are satisfied simultaneously, then the condition for coordinate is satisfied. If the color image CIMG is represented by a color system value that differs from the RGB-value (e.g., the CMYK-value), then the "preset black type pixel value" refers to the black type value in the color system.

Figure 4:
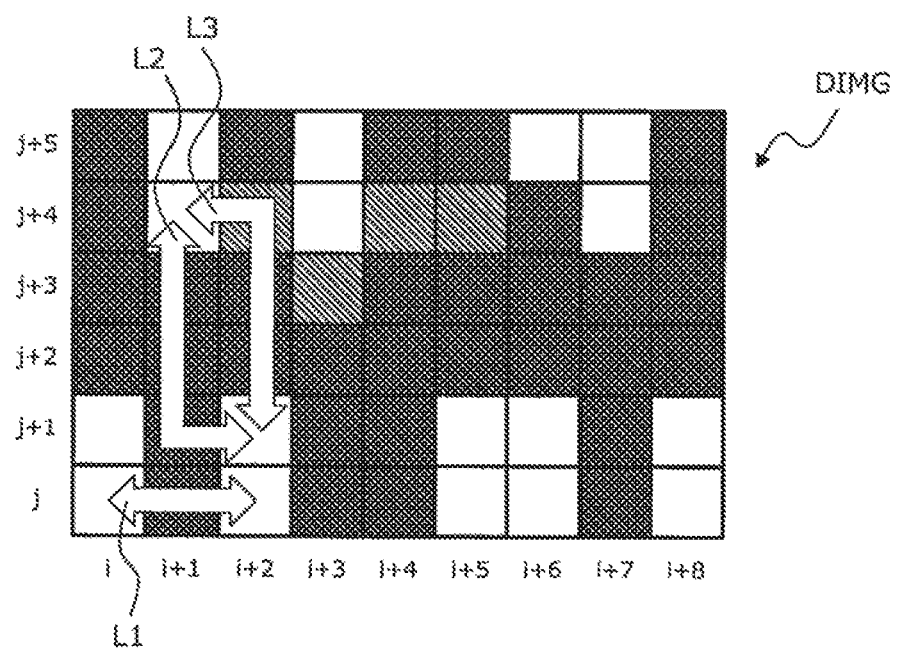
FIG. 4 is a diagram for illustrating a condition for coordinate.

FIG. 4 is a diagram for illustrating the condition ($v_1$). In FIG. 4, some areas in the distance image DIMG are depicted schematically. In the example shown in FIG. 4, for convenience of explanation, the coordinates CD(x, y) are represented by white, gray and black. The coordinate CDs(x, y) expressed by white and gray (e.g., coordinate CDs (i+2, j+1) and (i+2, j+4)) correspond to the data point DPs. The coordinate CDs(x, y) expressed by black (e.g., coordinate CDs(i+2, j+2) and (i+6, j+2)) correspond to the undetected coordinate $CD_{BR}(x, y)$.

The route coordinate $CD_L(x, y)$ is specified based on shortest route SL between the first coordinate $CD_{DP1}(x, y)$ and the second coordinate $CD_{DP2}(x, y)$. Suppose that the first coordinate $CD_{DP1}(x, y)$ is the coordinate CD(i, j) and the second coordinate $CD_{DP2}(x, y)$ is the coordinate CD(i+2, j). In this case, the shortest route SL is specified to the path L1 shown in FIG. 4. Then, the route coordinate $CD_L(x, y)$ is the coordinate CD(i+1, j). Here, the coordinate CD (i+1, j) corresponds to the undetected coordinate $CD_{BR}(x, y)$. Therefore, according to a combination of the coordinate CD(i, j) and the coordinate CD(i+2,j), the term ($v_1$) is satisfied.

There may be more than one shortest route SL. In this case, if any one of them satisfy the term ($v_1$), the term ($v_1$) is satisfied. Suppose that the first coordinate $CD_{DP1}(x, y)$ is the coordinate CD(i+2, j+1) and the second coordinate $CD_{DP2}(x, y)$ is the coordinate CD(i+1,j+4). In this case, the shortest route SL is the path L2 or L3 shown in FIG. 4. The path L3 containing the coordinate CD (i+2, j+4) does not satisfy $v_1$. On the other hand, the coordinates (i+1, j+1), (i+1, j+2) and (i+1, j+3) correspond to the undetected coordinate $CD_{BR}(x, y)$. Therefore, according to the path L2, the term ($v_1$) is satisfied. Therefore, according to the combination of the coordinate CD (i+2, j+1) and the coordinate CD(i+1, j+4), the term ($v_1$) is satisfied.

Figure 5:
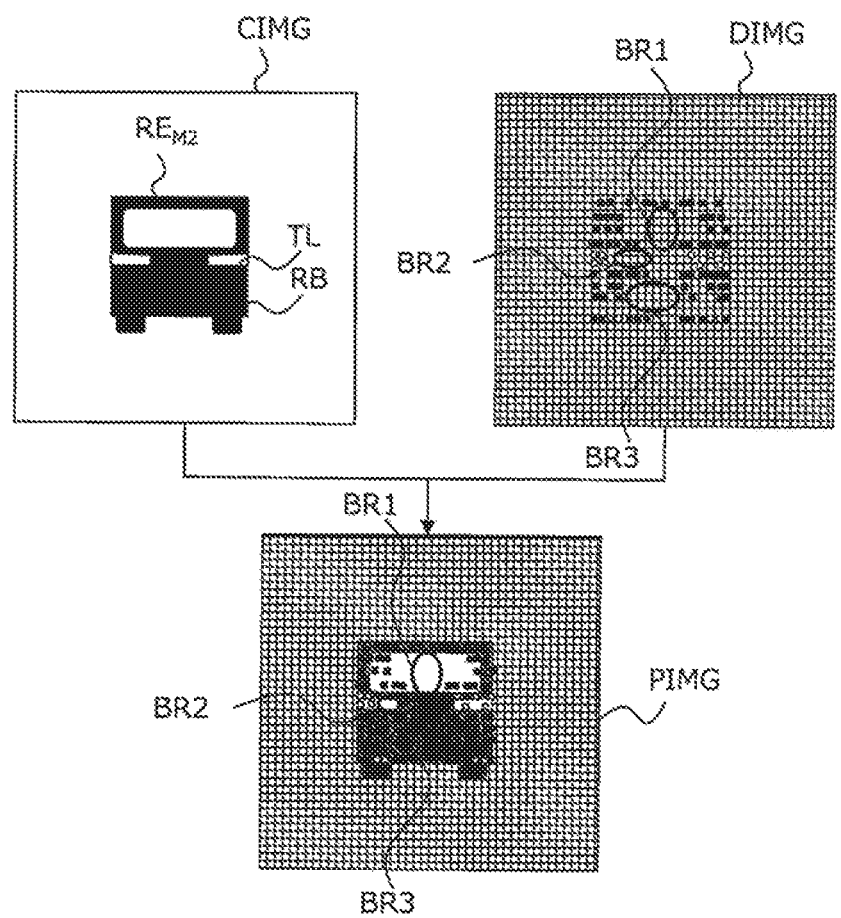
FIG. 5 is a diagram for illustrating the condition for coordinate.

FIG. 5 is a diagram for illustrating the term ($v_2$). In FIG. 5, the distance image DIMG and the color image CIMG described with reference to FIG. 3 are depicted. In FIG. 5, a projected picture PIMG that projects the color image CIMG on the distance image DIMG after alignment is depicted. As shown in this projected image PIMG, a glass of the rear portion $RE_{M2}$ is projected onto an undetected region BR1. Here, the pixel value IC(x, y) of the glass does not correspond to the preset black type pixel value. Therefore, the pixel value IC(x, y) of the coordinate CC(x, y) that overlaps the coordinate $CD_L$(x, y) is the RBG-value other than the black type. Hence, the term ($v_2$) is not satisfied.

On an undetected region BR2, a tail light TLs of the rear portion $RE_{M2}$ and a painted surface of the body are projected. Here, the pixel value IC(x, y) of the tail lamp TL does not correspond to the preset black type pixel value. Therefore, the pixel value IC(x, y) of the coordinate CC(x, y) that overlaps the coordinate $CD_L$(x, y) corresponding to the tail light TL does not satisfy the term ($v_2$). On the other hand, the pixel value IC(x, y) of the painted surface of the body corresponds to the preset black type pixel value. Therefore, according to the pixel value IC(x, y) of the coordinate CC(x, y) that overlaps the coordinate $CD_L$(x, y) corresponding to the painted surface of the body, the term ($v_2$) is satisfied.

On undetected region BR3, the painted surface of the body is projected. Therefore, the same conclusion as for the painted surface of the body projected on the undetected region BR2 is obtained.

1.4 Effect

According to the features described above, the clustering processing is executed based on the combination of the basic condition and the special condition. In particular, according to the special condition, even if there is the undetected coordinate $CD_{BR}$(x, y) between the first data point $DP_1$ and the second data point $DP_2$, it is possible to associate the data point $DP_1$ and the data point $DP_2$. Therefore, it is possible to group in the clustering processing the data point $DP_1$ and the data point $DP_2$ into the same cluster easily. Therefore, it is possible to suppress a misidentification of the low reflecting object.

1.5 Configuration Example of Object Recognition Device

Figure 6:
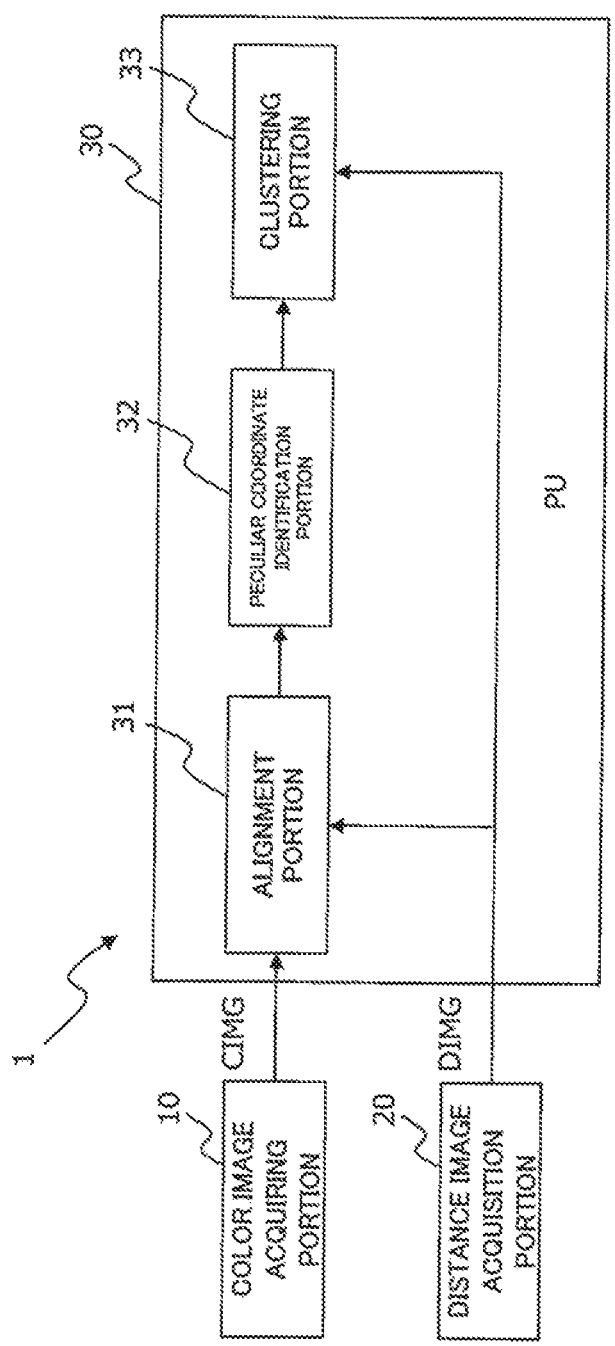
FIG. 6 is a block diagram for showing a configuration example of an object recognition device according to a first embodiment.

FIG. 6 is a diagram for showing a configuration example of an object recognition device 1 according to the first embodiment. As shown in FIG. 6, the object recognition device 1 includes a color image acquiring portion 10, a distance image acquisition portion 20, and a processing unit 30.

The color image acquiring portion 10 acquires the color image CIMG. The color image acquiring portion 10 may be, for example, a camera or an image datum sensor. The color image acquiring portion 10 may be an image processing unit separated from the camera or the image datum sensor. The color image acquiring portion 10 transmits the color image CIMG to the processing unit 30.

The distance image acquisition portion 20 acquires the distance image DIMG. The distance image acquisition portion 20 is, for example, the LIDAR LD shown in FIG. 1. The distance image acquisition portion 20 may be an image processing unit separated from the LIDAR LD. The distance image acquisition portion 20 transmits the distance image DIMG to the processing unit 30.

The processing unit 30 is a processing unit PU shown in FIG. 1. Typically, the processing unit 30 is a microcomputer that includes a processor, a memory, and an input and output interface. The processing unit 30 receives various information via the input and output interface. The processing unit 30 then executes the object recognition processing based on the received data.

The processing unit 30 includes an alignment portion 31, a peculiar coordinate identification portion 32, and a clustering portion 33 as functions for executing the recognition processing. These function blocks shown in FIG. 6 are realized when the processor of the processing unit 30 executes control programs stored in the memory.

The alignment portion 31 executes an alignment of the color image CIMG and the distance image DIMG. The alignment is performed with high accuracy using, for example, the following information (i) to (iii)
  (i) Calibration parameters of the camera (or the image sensor) and the LIDAR LD (ii) Acquisition time $t_{CIMG}$ of the color image CIMG and the acquisition time $t_{DIMG}$ of the distance image DIMG
  (iii) The position of the camera (or the image sensor) in the acquisition time $t_{CIMG}$ and the position of the LIDAR LD in the acquisition time $t_{DIMG}$ The peculiar coordinate identification portion 32 projects the color image CIMG onto the distance image DIMG after the alignment. The peculiar coordinate identification portion 32 identifies a peculiar coordinate CP(x, y) on the distance image DIMG on which the color image CIMG was projected (i.e., the projected images PIMG). The peculiar coordinate CP(x, y) is a coordinate CP(x, y) on the projected picture PIMG that satisfies the following terms (i) and (ii).
  (i) The coordinate CP(x, y) corresponds to the undetected coordinate $CD_{BR}$ on the distance image DIMG
  (ii) The pixel value IC(x, y) is the preset black type pixel value on the color image CIMG The peculiar coordinate identification portion 32 transmits peculiar coordinate $CP_{PE}$(x, y) to the clustering portion 33 when the peculiar coordinate $CP_{PE}$(x, y) is specified.

The clustering portion 33 executes the clustering processing. The clustering processing is responsible for associating at least two data point DPs. In the association processing, it is determined whether the basic or special condition is satisfied with respect to the first data point $DP_1$ and the second data point $DP_2$ on the distance image DIMG. Note that the determination of the condition for coordinate which is included in the special condition is executed based on the peculiar coordinate CP(x, y) and the route coordinate $CD_L$(x, y). If the peculiar coordinate CP(x, y) corresponds to the route coordinate $CD_L$(x, y), the condition for coordinate is satisfied. If the basic or special condition is satisfied, the first data point $DP_1$ and the second data point $DP_2$ are associated.

1.6 Specific Processing

Figure 7:
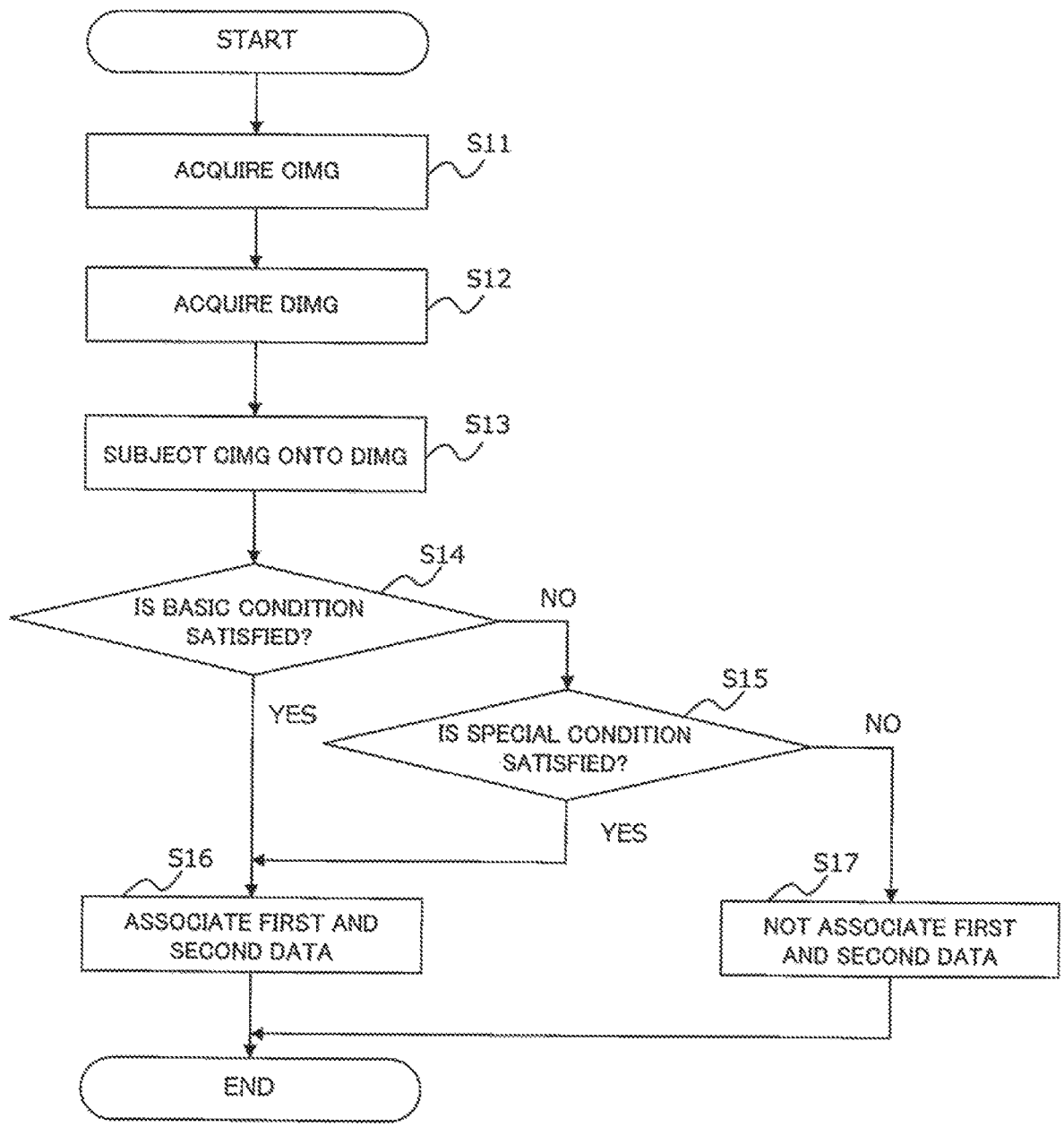
FIG. 7 is a flowchart for illustrating an example of processing executed in a processing unit.

FIG. 7 is a flowchart for illustrating an example processing executed by the processing unit 30. The routine shown in this drawing is repeatedly executed at a predetermined control cycle.

First, in the step S11, the color image CIMG is acquired. Subsequently, in the step S12, the distance image DIMG is acquired. Subsequently, in the step S13, the color image CIMG is projected onto the distance image DIMG. The alignment of the color image CIMG and the distance image DIMG is performed prior to the projection of the color image CIMG.

In the step S14, it is determined whether or not the basic condition is satisfied. In the step S15, it is determined whether or not the special condition is satisfied. If judgement result of the step S14 or S15 is positive, then in the step S16 these data points are associated. If both judgement result of the steps S14 and S15 are negative, these data points are not associated in the step S17. Target to be judged of the basic or special condition is all data point DPs on the distance image DIMG. That is, judgement processing including the steps S14 to S17 is repeated until judgement results of all data point DPs are obtained.

2. Second Embodiment

Next, a second embodiment will be described with reference FIGS. 8 to 10. Note that descriptions overlapping with those in the first embodiment are omitted as appropriate.

2.1 Features of Object Recognition Processing According to Second Embodiment

The object recognition processing of the second embodiment includes interpolation processing. The interpolation processing is processing to interpolate undetected Z positional data in the undetected coordinate $CD_{BR}(x, y)$. The interpolation processing is executed prior to the execution of the clustering processing. In the interpolation processing, based on a applicable condition, it is determined whether or not to take up the distance image DIMG in which the undetected Z positional data has interpolated in the undetected coordinate $CD_{BR}(x, y)$.

For convenience of explanation, the undetected Z positional data in the undetected coordinate $CD_{BR}(x, y)$ is referred to as "undetected data" in the following description. Further, the Z positional data for the interpolation of the undetected data is referred to as "data for interpolation". Further, the distance image DIMG expressed by the 3D positional data in which the undetected data is interpolated is referred to as an "interpolated image IIMG". Further, the undetected coordinate $CD_{BR}(x, y)$ after the interpolation of the undetected data is referred to as an "interpolated coordinate $CD_{IN}(x, y)$". Further, the data point DP corresponding to the interpolated coordinate $CD_{IN}(x, y)$ is referred to as an "interpolated data point DPI".

Now interpolation methods of the undetected data are explained. In a first example, the Z positional data of the coordinate CD(x, y) adjacent to the undetected coordinate $CD_{BR}(x, y)$ corresponds to the data for interpolation. The "coordinate CD(x, y) adjacent to the undetected coordinate $CD_{BR}(x, y)$" includes not only the coordinate CD(x, y) corresponding to the data point DP, but also the interpolated coordinate $CD_{IN}(x, y)$. In the first case, all of the undetected coordinate $CD_{BR}(x, y)$ may be replaced by the interpolated coordinate $CD_{IN}(x, y)$. Note that such the interpolation method is well known.

A second example will be described with reference to FIG. 8. In FIG. 8, the distance image DIMGs before and after the interpolation. The distance image DIMG before interpolation is the same as the distance image DIMG shown in FIG. 3. In the second example, a data point DP search is performed in a negative y-axis (i.e., a negative direction in the vertical axis) of the undetected region BR. Then, the undetected data is interpolated by the Z positional data of the data point DP which is found in the search at first. The "data point DP which is found in the search at first" is a data point DP having shortest distance from the undetected region BR in the y-axis negative direction. As described above, in the second example, the Z positional data in the data point DP which is found in the search at first corresponds to the data for interpolation.

Figure 8:
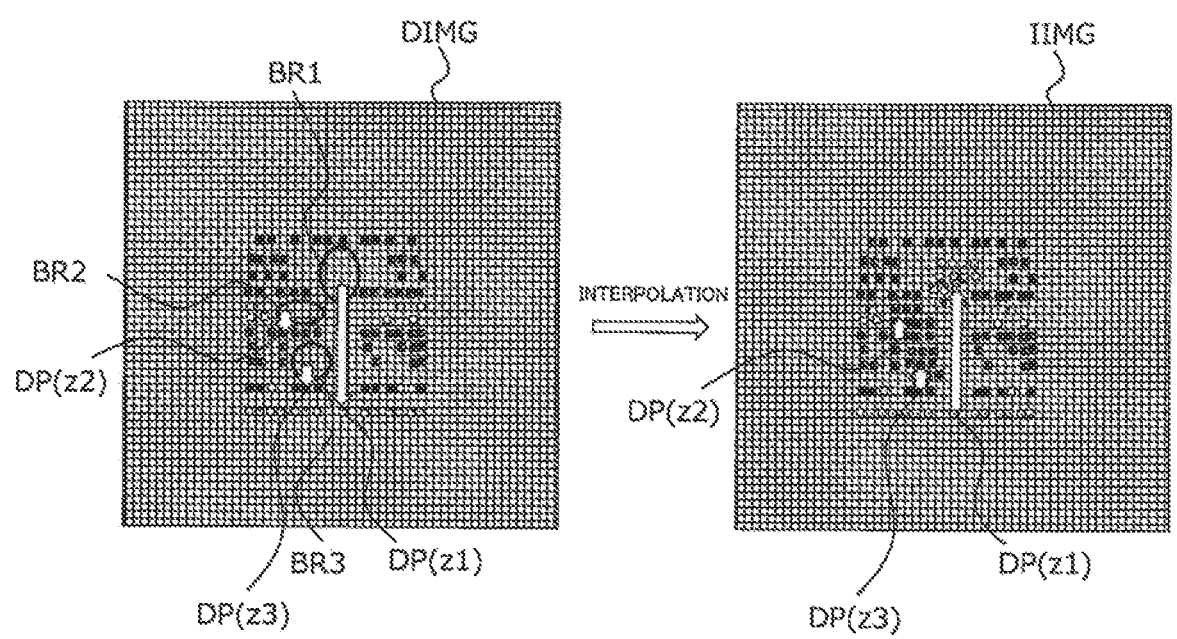
FIG. 8 is a diagram for explaining a second example of an interpolation processing according to a second embodiment.

In the example shown in FIG. 8, all of the undetected data in the undetected region BR1 are interpolation by the Z positional data (z1) of the data point DP. All of the undetected data of the undetected region BR2 are interpolation by the Z positional data (z2) of the data point DP. All of the undetected data of the undetected region BR3 are interpolation by the Z positional data (z3) of the data point DP.

Actually, the data point DP(z1) is the Z positional data of the road surface RS just below the vehicle M2. Therefore, in this case, the interpolated data point DPI in which the accuracy of the Z positional data is ensured can be obtained. On the other hand, the data point DP(z2) and the data point DP(z3) are actual the Z positional data on the panted surface of the body. In this case, it is possible to make it easier to associate the data point DPs around the undetected region BR2 (or the undetected region BR3) with the interpolated data point DPI.

In the interpolation processing, further, it is determined whether or not to apply the data for interpolation to the interpolated image IIMG. This determination is executed based on the following applicable condition.

Applicable condition: when the alignment of the distance image DIMG and the color image CIMG is performed, the pixel value IC(x, y) that overlaps the coordinate $CD_{IN}(x, y)$ corresponds to the preset black type pixel value.

If the applicable condition is satisfied, the data for interpolation is taken up for the interpolated image IIMG. Otherwise, the data for interpolation is discarded.

2.2 Effect

According to the features described above, the undetected data is interpolated by the execution of the interpolation processing. Therefore, it is possible to reduce a computational load on the clustering processing which is executed after the execution of the interpolation processing. According to the second example of the interpolation method, it is possible to reach the Z positional data of the road surface RS which is located directly under the vehicle M2. Therefore, it is possible to improve the accuracy of the clustering processing by the interpolated data point DPI in which the accuracy of the Z positional data is ensured.

2.3 Configuration Example of Object Recognition Device

Figure 9:
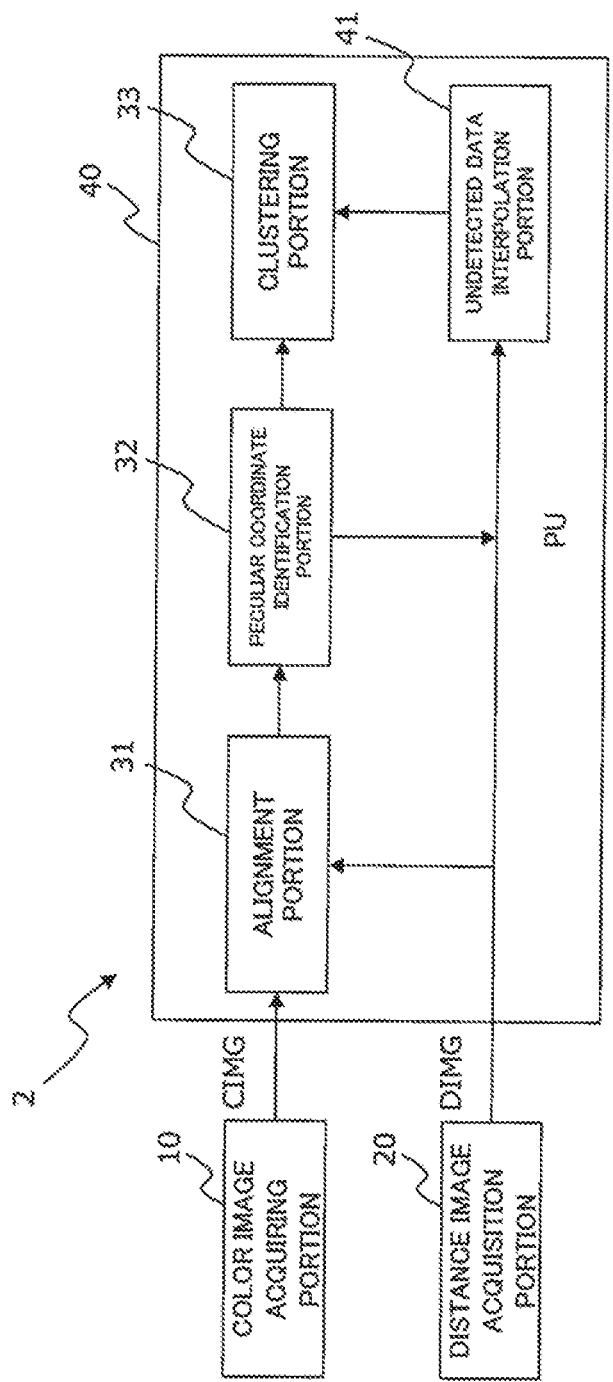
FIG. 9 is a block diagram for showing the configuration example of the object recognition device according to the second embodiment.

FIG. 9 is a diagram showing configuration example of object recognition device 2 according to second embodiment. As shown in FIG. 9, object recognition device 2 includes the color image acquiring portion 10, the distance image acquisition portion 20 and the processing unit 40.

The hardware configuration of the processing unit 40 is the same as that of the processing unit 30 shown in FIG. 6. The function to execute the object recognition processing which is included in the processing unit 40 is the same as those included in the processing unit 30. The processing unit 40 comprises an undetected data interpolation portion 41 as a configuration to execute the interpolation processing. These function blocks shown in FIG. 9 are realized when the processor of the processing unit 40 executes control program stored in the memory.

The undetected data interpolation portion 41 executes the interpolation processing. In the interpolation processing, the undetected data is interpolated by the interpolation methods described above. In the interpolation processing, it is also determined whether or not to apply the data for interpolation to the interpolated image IIMG. This determination is executed based on the peculiar coordinate CP(x, y) and the applicable condition. As described above, the peculiar coordinate CP(x, y) is specified by the peculiar coordinate identification portion 32. If the interpolated coordinate $CD_{IN}(x, y)$ corresponds to the peculiar coordinate CP(x, y), the applicable condition is satisfied.

2.4 Specific Processing

Figure 10:
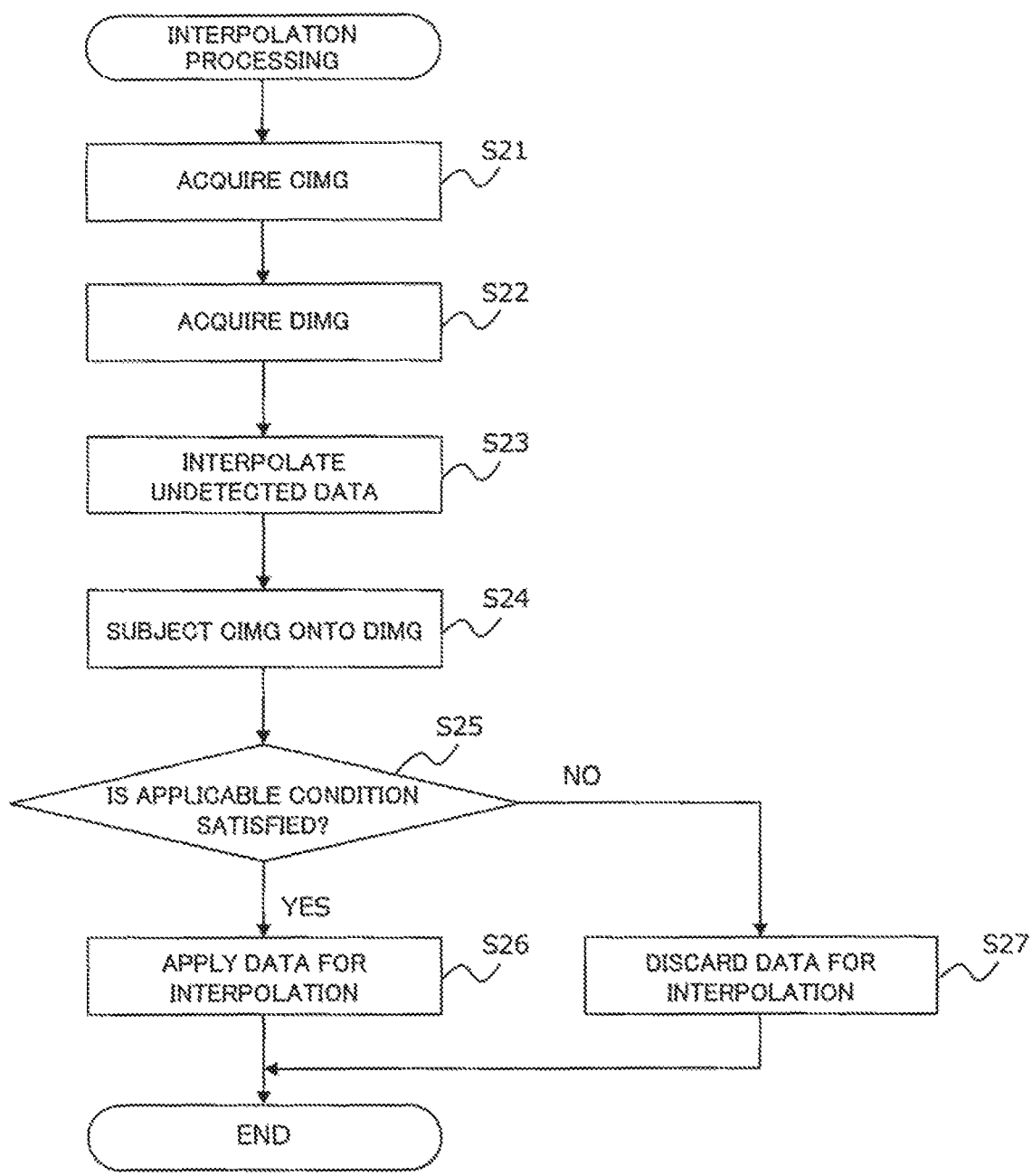
FIG. 10 is a flowchart for illustrating the example of processing executed in the processing unit.

FIG. 10 is a flowchart for illustrating an example of the interpolation processing executed by the processing unit 40.

The routine shown in this drawing is repeatedly executed at a predetermined control cycle.

The processing of the steps S21 and S22 is the same as that of the steps S11 and S12 described in FIG. 7. In the step S23, the undetected data is interpolated. The interpolation method is as described above. The processing of the step S24 is the same as that of the step S13 described in FIG. 7.

In the step S25, it is determined whether or not the applicable condition is satisfied. If the judgement result of the step S25 is positive, then in the step S26 the data for interpolation is applied to the interpolated image IIMG. If the judgement result of the step S25 is negative, the data for interpolation is discarded in the step S27. Targets to be judged of the applicable condition are all of the interpolated data point DPIs on the interpolated image IIMG. That is, the judgement processing of the steps S25 to S27 is repeated until the judgement result of all of the interpolated data point DPIs is obtained.

3. Third Embodiment

Next, a third embodiment will be described with reference to FIGS. 11 and 12. Note that descriptions overlapping with those in the first or second embodiment will be omitted as appropriate.

3.1 Features of Object Recognition Processing According to Third Embodiment

Like the object recognition processing according to the second embodiment, the object recognition processing according to third embodiment includes the interpolation processing. However, in the interpolation processing according to third embodiment, the Z positional data of the coordinate CD(x, y) corresponding to the road surface RS which locates directly under the vehicle M2 is specified based on positional information and terrain information of the vehicle M1. That is, the interpolation processing according to the third embodiment differs from that according to the second embodiment in the interpolation method.

For convenience of explanation, a coordinate CD(x, y) corresponding to the road surface RS is referred to as a "road surface coordinate $CD_{RS}(x, y)$" in the following description.

The interpolation processing according to third embodiment will be described with reference to FIG. 11. In FIG. 11, the distance image DIMGs before and after the interpolation are depicted. The distance image DIMG before the interpolation is the same as the distance image DIMG shown in FIG. 3. In the example shown in FIG. 11, the data point DP search is performed in the negative y-axis direction of the undetected region BR until a data point DP corresponding to the road surface RS is found. The "data point DP corresponding to the road surface RS" is a data point DP having shortest distance from the undetected region BR in the y-axis negative direction. Then, the undetected data is interpolated by the Z positional data of the data point DP corresponding to the road surface RS. As described above, in third embodiment, the Z positional data of the data point DP corresponding to the road surface RS corresponds to data for interpolation.

Figure 11:
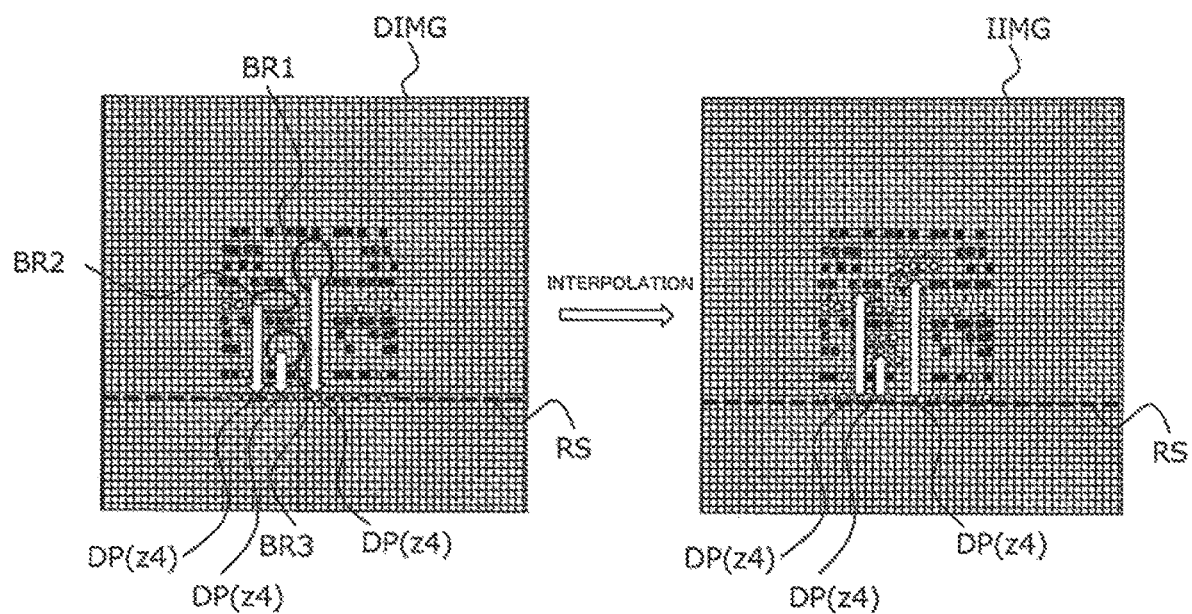
FIG. 11 is a diagram for explaining the interpolation processing according to a third embodiment.

In the example shown in FIG. 11, the Z positional data of the data point DP corresponding to the road surface RS is z4. Thus, in this example, all of the undetected data of the undetected regions BR1 to BR3 are interpolated by the same Z positional data (i.e., z4).

3.2 Effect

According to the features described above, it is possible to obtain the same effects as those in the second embodiment. That is, it is possible to reduce a computational load on the clustering processing which is executed after the execution of the interpolation processing. In addition, since the interpolation is performed based on the Z positional data of road surface RS which locates directly under vehicle M2, it is possible to improve the accuracy of the clustering processing by the interpolated data point DP in which the accuracy of the Z positional data is secured.

3.3 Configuration Example of Object Recognition Device

Figure 12:
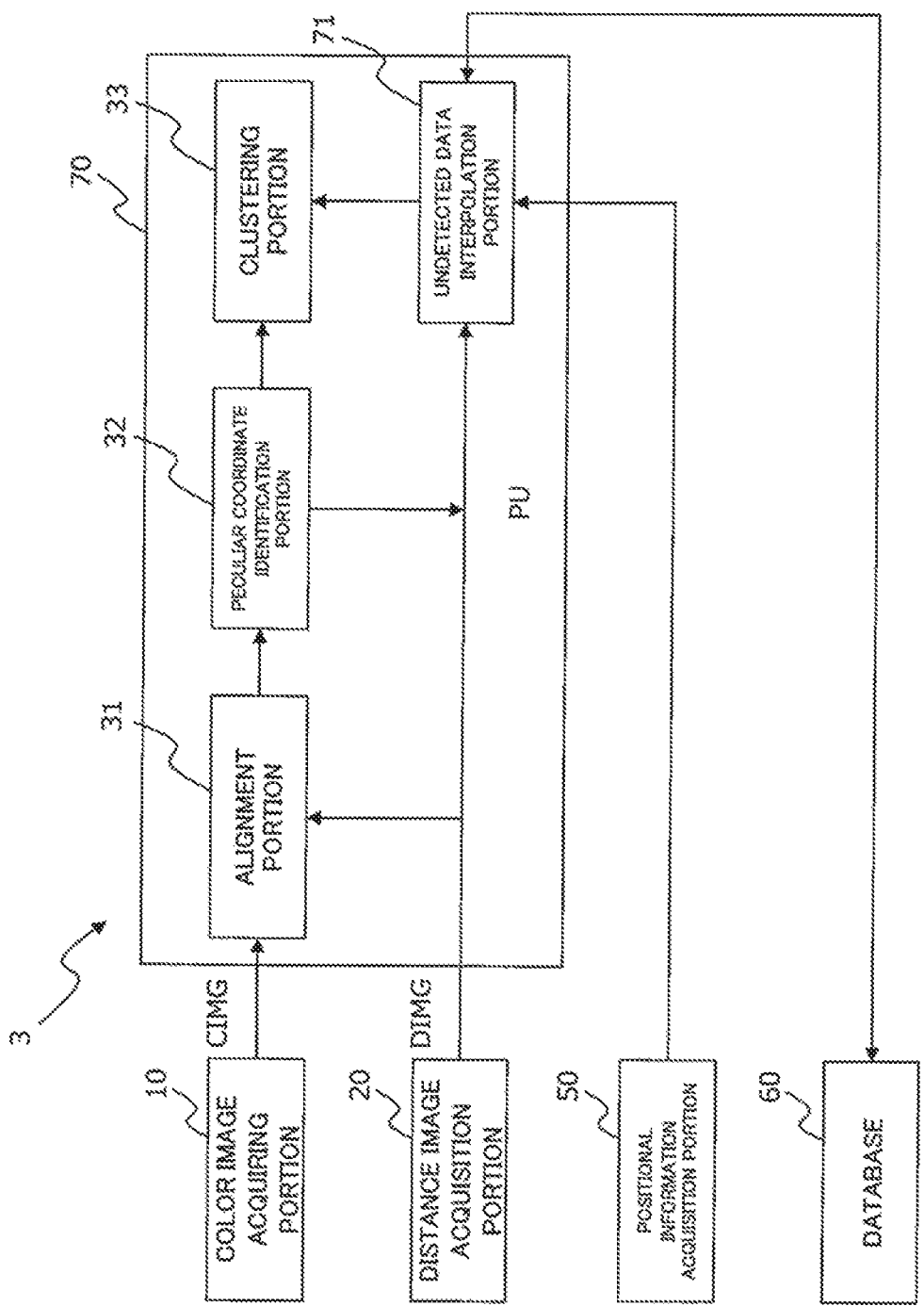
FIG. 12 is a block diagram for showing the configuration example of the object recognition device according to the third embodiment.

FIG. 12 is a diagram for showing a configuration example of the object recognition device according to the third embodiment. As illustrated in FIG. 12, the object recognition device 3 comprises the color image acquiring portion 10, the distance image acquisition portion 20, a positional information acquisition portion 50, a data base 60 and a processing unit 70.

The positional information acquisition portion 50 acquires positional information of the vehicle M1. The positional information acquisition portion 50 is, for example, a GNSS (Global Navigation Satellite System) receiver. The positional information acquisition portion 50 receives signals from three or more satellites. The positional information acquisition portion 50 calculates positional information of the vehicle M1 based on the received signals. The positional information acquisition portion 50 transmits the positional information to the processing unit 70.

The database 60 is a database in which terrain information is stored. The terrain information is map information on terrain. The terrain information includes height Z of the road surface RS at each position[X, Y] on a map.

The hardware configuration of the processing unit 70 is the same as that of the processing unit 30 described with reference to FIG. 6. The function to execute the object recognition processing which is included in the processing unit 70 is the same as those included in the processing unit 30. The processing unit 70 comprises an undetected data interpolation portion 71 as a configuration to execute the interpolation processing. These function blocks shown in FIG. 12 are realized when the processor of the processing unit 70 executes control program stored in the memory.

The undetected data interpolation portion 71 executes the interpolation processing. The interpolation processing executed by the undetected data interpolation portion 71 is essentially the same as that executed by the undetected data interpolation portion 41 described in FIG. 9. That is, in the interpolation processing, the undetected data is interpolated by the interpolation method described above. In the interpolation processing, it is also determined whether or not to apply the Z positional data ($z_{RS}$) to the interpolated image IIMG.

What is claimed is:

1. An object recognition device comprising:
   a Laser Imaging Detection and Ranging Device (LIDAR) irradiates a laser beam around a vehicle and detects a laser beam reflected at surroundings of the vehicle;
   a processor executes clustering processing of a detected point group of the LIDAR based on three-dimensional (3D) positional data of respective detected point including time of flight data of the laser beam; and
   a color image acquiring portion which acquires color images of the surroundings,
   wherein, in the clustering processing, the processor associates a first detection point corresponding to a first coordinate with a second detection point corresponding to a second coordinate when a linkable condition is satisfied in the first and second coordinates on a distance image represented by the 3D positional data, wherein the linkable condition is satisfied when a distance between the first and second coordinates is greater than or equal to a predetermined distance, a difference in the time of flight data between the first and second detection points is less than a predetermined difference, and a condition for coordinate is satisfied, wherein the condition for coordinate is satisfied when a route coordinate indicating a coordinate locating on a route between the first and second coordinates is an undetected coordinate at which the time of flight data has not been calculated, and a color pixel value indicating a pixel value of every coordinate that overlaps the route coordinate is a preset black type pixel value.

2. The object recognition device according to claim 1, wherein the processor further executes interpolation processing before the execution of the clustering processing, wherein the interpolation processing is processing to interpolate the time of flight data in the undetected coordinate, wherein, in the interpolate processing, the processing unit takes up data for interpolation as the time of flight data at the undetected coordinate if applicable condition is satisfied, wherein the applicable condition is satisfied when the color pixel value of the undetected coordinate after the interpolation is the preset black type pixel value.

3. The object recognition device according to claim 2, wherein the data for interpolation is the time of flight data at a coordinate having shortest distance from the undetected coordinate in a negative direction in a vertical axis of the distance image.

4. The object recognition device according to claim 2, further comprising:
- a positional information acquisition portion acquires a positional information of the vehicle; and
- a database that stores a terrain information, wherein, in the interpolation processing, the processor specifies a road surface coordinate indicating a coordinate corresponding to a road surface from coordinates of the distance image based on the positional information and the terrain information, wherein the data for interpolation is the time of flight data at the road surface coordinate having shortest distance from the undetected coordinate in a negative direction in a vertical axis of the distance image.

* * * * *